H. B. CRANDALL.
Blacksmith's Butteris.
No. 207,348. Patented Aug. 27, 1878.
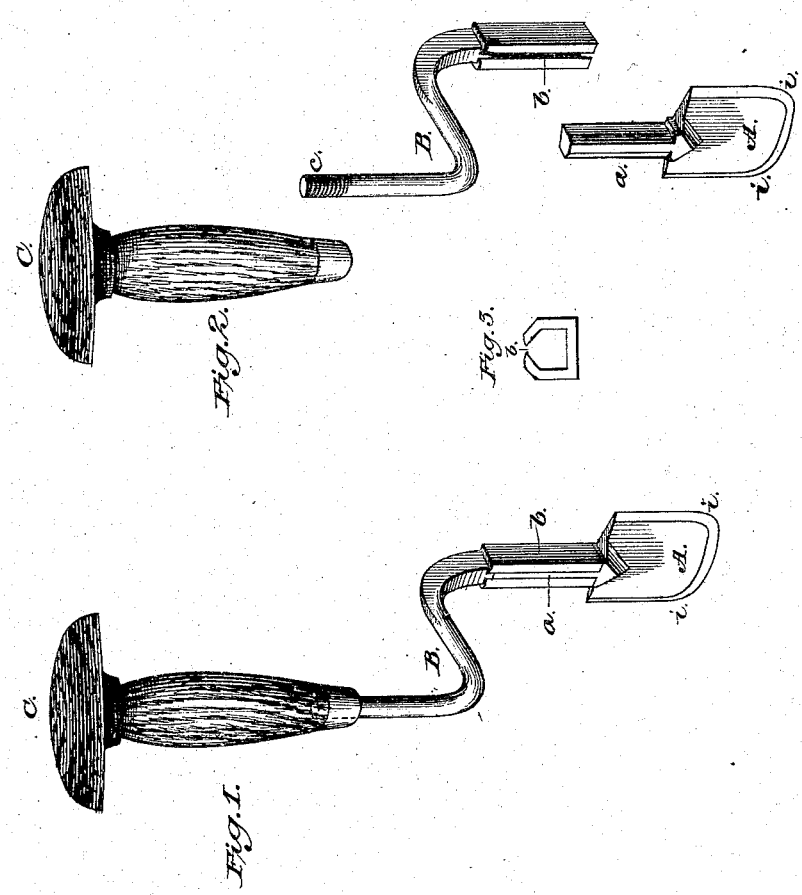

UNITED STATES PATENT OFFICE.

HENRY B. CRANDALL, OF HOMER, NEW YORK, ASSIGNOR OF ONE-HALF HIS RIGHT TO WATSON HOLMES, OF SAME PLACE.

IMPROVEMENT IN BLACKSMITHS' BUTTERISES.

Specification forming part of Letters Patent No. 207,348, dated August 27, 1878; application filed July 8, 1878.

*To all whom it may concern:*

Be it known that I, H. B. CRANDALL, of the town of Homer, in the county of Cortland and State of New York, have invented certain new and useful Improvements in Blacksmiths' Butterises; and I do hereby declare that the following is a full, clear, and exact description thereof, which will enable others skilled in the art to which it appertains to make and use the same, reference being had to the accompanying drawings, and to the letters of reference marked thereon, which form a part of this specification.

In the drawings, Figure 1 represents my improved butteris with its parts all together as when ready for use. Fig. 2 represents the blade and shoulder-piece, both detached from the arm; and Fig. 3 represents a view showing the end of the socket.

The invention consists in making a detachable blade, with a shank beveled at its front edge on opposite sides, and providing an arm with a socket slotted at its front, and the walls at each side of said slot beveled on the inside to correspond with the bevels on the shank, serving as a guide in inserting the shank.

A represents the blade, B the arm, and C the handle or shoulder-piece. The blade has a shank, *a*, which fits firmly into a socket, *b*, at the end of the arm B. The shank *a* is beveled on opposite sides at its front edge, and the socket *b* on the arm B is provided with a slot at its front, and at each side of said slot the walls are beveled on the inside, to correspond with the bevels on the shank and serve as a guide in inserting said shank.

The advantages of having a detachable blade are readily seen. Whenever one blade becomes dull another can be readily put in its place.

By making the shank *a* slightly tapering from the blade, and the socket *b* to correspond, they wedge together, and the socket holds the blade firmly without the necessity of any other device or attachment.

By reason of the slot in the socket a certain amount of elasticity is imparted to the same, allowing the socket to spring as the shank is inserted, and firmly secure the shank therein.

The upper end of the arm B is cut with screw-threads *c*, by means of which and corresponding threads cut in the socket of the shoulder-piece the arm B may be adjusted by lengthening or shortening, so as to suit the requirements of different workmen.

Another improvement in my butteris consists in the peculiar shape of the blade A, which I make by rounding the corners *i i* and making the under side of the blade slightly convex. By thus shaping the blade it is less likely to draw down and cut too deep into the hoof when paring it.

Having thus described my invention, I claim—

The combination, in a blacksmith's butteris, of the blade A, provided with a shank, *a*, beveled on opposite sides at its front edge, and the socket *b* on the arm B, for the reception of the shank *a*, provided with a slot in front, whereby a certain amount of elasticity is imparted to the socket, the walls of said socket, on each side of the slot, being beveled on the inside to correspond with the beveled edges of the shank, to serve as a guide for the insertion of said shank, substantially as specified.

In testimony that I claim the foregoing as my own I have hereunto affixed my signature in presence of two witnesses.

HENRY B. CRANDALL.

Witnesses:
 GEORGE J. MAYCUMBER,
 CHARLES O. DEWEY.